US012688138B2

(12) United States Patent
Saleh et al.

(10) Patent No.: US 12,688,138 B2
(45) Date of Patent: *Jul. 21, 2026

(54) ACTIVE BRIDGE CHIPLET WITH INTEGRATED CACHE

(71) Applicant: ADVANCED MICRO DEVICES, INC., Santa Clara, CA (US)

(72) Inventors: Skyler J. Saleh, San Diego, CA (US); Ruijin Wu, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,604

(22) Filed: Jun. 1, 2023

(65) Prior Publication Data

US 2023/0305981 A1 Sep. 28, 2023

Related U.S. Application Data

(63) Continuation of application No. 17/971,116, filed on Oct. 21, 2022, now abandoned, which is a continuation of application No. 16/585,452, filed on Sep. 27, 2019, now Pat. No. 11,507,527.

(51) Int. Cl.
*G06F 13/40* (2006.01)
*G06F 12/0815* (2016.01)
*G06T 1/20* (2006.01)

(52) U.S. Cl.
CPC ...... *G06F 13/4027* (2013.01); *G06F 12/0815* (2013.01); *G06T 1/20* (2013.01); *G06F 2212/1032* (2013.01)

(58) Field of Classification Search
CPC ............. G06F 13/4027; G06F 12/0815; G06F 2212/1032; G06F 13/40; G06F 2212/302; G06F 2212/30; G06T 1/20
See application file for complete search history.

(56) References Cited

U.S. PATENT DOCUMENTS 10,803,548 B2 * 10/2020 Matam .................. G06F 13/409
11,211,695 B1 12/2021 Paulsen et al.
11,335,663 B2 * 5/2022 Liff ...................... H01L 23/5386
(Continued)

FOREIGN PATENT DOCUMENTS

CN 109904083 6/2019
EP 3385848 10/2018
(Continued)

OTHER PUBLICATIONS

Notice of Allowance mailed Jul. 31, 2023 for U.S. Appl. No. 16/456,287. 7 pages.
(Continued)

*Primary Examiner* — Idriss N Alrobaye
*Assistant Examiner* — Richard B Franklin

(57) ABSTRACT

A chiplet system includes a central processing unit (CPU) communicably coupled to a first GPU chiplet of a GPU chiplet array. The GPU chiplet array includes the first GPU chiplet communicably coupled to the CPU via a bus and a second GPU chiplet communicably coupled to the first GPU chiplet via an active bridge chiplet. The active bridge chiplet is an active silicon die that bridges GPU chiplets and allows partitioning of systems-on-a-chip (SoC) functionality into smaller functional chiplet groupings.

18 Claims, 6 Drawing Sheets

(56)                References Cited

U.S. PATENT DOCUMENTS

| | | |
|---|---|---|
| 2007/0273699 A1 | 11/2007 | Sasaki et al. |
| 2011/0072213 A1 | 3/2011 | Nickolls et al. |
| 2014/0176187 A1 | 6/2014 | Jayasena et al. |
| 2015/0171015 A1 | 6/2015 | Mahajan et al. |
| 2017/0365580 A1 | 12/2017 | Shih et al. |
| 2018/0358298 A1 | 12/2018 | Zhai et al. |
| 2018/0366436 A1 | 12/2018 | Wang et al. |
| 2019/0123022 A1 | 4/2019 | Teig et al. |
| 2019/0221556 A1 | 7/2019 | Gomes et al. |

FOREIGN PATENT DOCUMENTS

| | | |
|---|---|---|
| EP | 3511980 | 7/2019 |
| JP | 2007316859 | 12/2007 |
| JP | 2011523745 | 12/2009 |
| JP | 2015524979 | 2/2014 |
| JP | 2016529639 | 9/2016 |
| JP | 2017503245 | 1/2017 |
| WO | 2012137339 | 10/2012 |
| WO | 2019032322 | 2/2019 |
| WO | 2019132971 | 4/2019 |

OTHER PUBLICATIONS

Office Action issued in Indian Application No. 202117059190, mailed Oct. 9, 2023, 10 pages.

Office Action issued in Japanese Application No. 2022-516307, mailed Oct. 17, 2023, 4 pages.

Extended European Search Report issued in Application No. 20867435.8, mailed Oct. 10, 2023, 11 pages.

Extended European Search Report issued in Application No. 20832015, mailed Jun. 22, 2023, 12 Pages.

Yin, Jieming et al. "Modular Routing Design for Chiplet-Based Systems" 2018 ACM/IEEE 45th Annual International Symposium on Computer Achitecture (ISCA), IEEE, 2018, pp. 726-738.

Extended European Search Report issued in Application No. 20868658.4, mailed Sep. 27, 2023, 7 pages.

Beck et al., "'Zeppelin': An SoC for Multichip Architectures," IEEE International Solid-State Circuits Conference, 2018, 3 pages.

Office Action issued in Korean Application No. 10-2022-7012861, mailed Feb. 14, 2024, 3 pages.

Japanese Office Action issued in Application No. 2022-516307, mailed Oct. 17, 2023, 4 pages.

Office Action issued in Indian Application No. 202217015275 mailed Aug. 28, 2024, 5 pages.

Office Action issued in Korean Application No. 10-2022-7011449, mailed Sep. 10, 2024, 7 pages.

Office Action issued in Japanese Application No. 2022-517359, mailed Oct. 1, 2024, 3 pages.

Office Action mailed Mar. 6, 2025 for Indian Application No. 202217012817, 8 pages.

Office Action mailed Mar. 11, 2025 for Japanese Application No. 2024-068210, 7 pages.

Yin J, Lin Z, Kayiran O, Poremba M, Altaf MS, Jerger NE, Loh GH. Modular routing design for chiplet-based systems. In2018 ACM/IEEE 45th Annual International Symposium on Computer Architecture (ISCA) Jun. 1, 2018 (13 pgs). IEEE.

Beck N, White S, Paraschou M, Naffziger S. 'Zeppelin': An SoC for multichip architectures. In 2018 IEEE International Solid-State Circuits Conference—(ISSCC) Feb. 11, 2018 (2 pgs). IEEE.

Office Action mailed Mar. 11, 2025 for Japanese Application No. 2022-517359, 5 pages.

Office Action (Decision of Refusal) mailed Sep. 22, 2025 for JP2022-517359, 11 pages.

Office Action mailed Sep. 26, 2025 for JP2024-068210, 12 pages.

Office Action mailed Apr. 2, 2026 for European Application No. 20868658.4, 8 pages.

* cited by examiner

ACTIVE BRIDGE CHIPLET WITH INTEGRATED CACHE

CROSS-REFERENCE TO RELATED APPLICATIONS

The present application is a Continuation application of U.S. patent application Ser. No. 17/971,116, entitled "ACTIVE BRIDGE CHIPLET WITH INTEGRATED CACHE", and filed on Oct. 21, 2022, which is a Continuation application of U.S. patent application Ser. No. 16/585, 452, entitled "ACTIVE BRIDGE CHIPLET WITH INTEGRATED CACHE", and filed on Sep. 27, 2019, issued as U.S. Pat. No. 11,507,527 B2 on Nov. 22, 2022, the entirety of which is incorporated by reference herein.

BACKGROUND

Computing devices such as mobile phones, personal digital assistants (PDAs), digital cameras, portable players, gaming, and other devices require the integration of more performance and features into increasingly smaller spaces. As a result, the density of processor dies and number of dies integrated within a single integrated circuit (IC) package have increased. Some conventional multi-chip modules include two or more semiconductor chips mounted side-by-side on a carrier substrate or in some cases on an interposer (so-called "2.5D") that is, in-turn, mounted on a carrier substrate.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
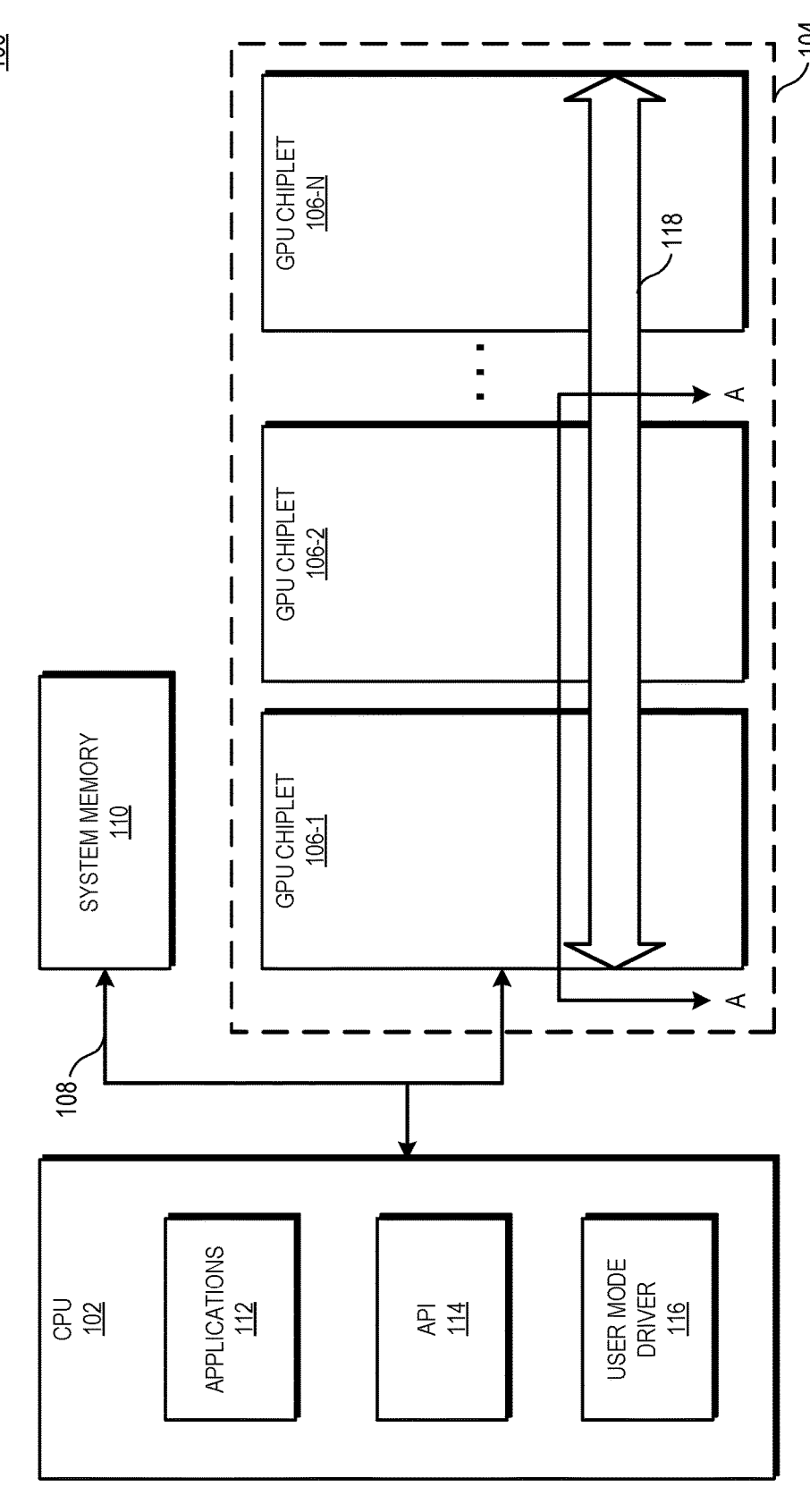
FIG. 1 is a block diagram illustrating a processing system employing active bridge chiplets for coupling GPU chiplets in accordance with some embodiments.

Conventional monolithic die designs are becoming increasingly expensive to manufacture. Chiplets have been used successfully in CPU architectures to reduce cost of manufacture and improve yields, as the heterogeneous computational nature of CPUs is more naturally suited to separate CPU cores into distinct units that do not require much inter-communication. In contrast, GPU work by its nature includes parallel work. However, the geometry that a GPU processes includes not only sections of fully parallel work but also work that requires synchronous ordering between different sections. Accordingly, a GPU programming model that spreads sections of work across multiple GPUs are often inefficient, as it is difficult and expensive computationally to synchronize the memory contents of shared resources throughout the entire system to provide a coherent view of the memory to applications. Additionally, from a logical point of view, applications are written with the view that the system only has a single GPU. That is, even though a conventional GPU includes many GPU cores, applications are programmed as addressing a single device. For at least these reasons, it has been historically challenging to bring chiplet design methodology to GPU architectures.

To improve system performance by using GPU chiplets without altering a relatively simple programming model, FIGS. 1-6 illustrate systems and methods that utilize active bridge chiplets for coupling GPU chiplets. In various embodiments, the active bridge chiplet is an active silicon die for inter-chiplet communications. In various embodiments, a system includes a central processing unit (CPU) communicably coupled to a first graphics processing unit (GPU) chiplet of a GPU chiplet array. The GPU chiplet array includes the first GPU chiplet communicably coupled to the CPU via a bus and a second GPU chiplet communicably coupled to the first GPU chiplet via an active bridge chiplet, thereby breaking up systems-on-a-chip (SoC) into smaller functional groupings referred to as "chiplets" or "GPU chiplets" that perform functions of the various cores of the SoC (e.g., a GPU).

Currently, various architectures already have at least one level of cache (e.g., L3 or other last level cache (LLC)) that is coherent across the entire conventional GPU die. Here, the chiplet-based GPU architecture positions those physical resources (e.g., LLC) on different dies and communicably couples those physical resources such that the LLC level is unified and remains cache coherent across all GPU chiplets. Thus, although operating in a massively parallel environment, the L3 cache level is coherent. During operations, a memory address request from the CPU to the GPU is transmitted only to a single GPU chiplet, which then communicates with the active bridge chiplet to locate the requested data. From the CPU's point of view, it appears to be addressing a single die, monolithic GPU. This allows for use of a large-capacity, multi-chiplet GPU that appears as a single device to an application.

FIG. 1 is a block diagram illustrating a processing system 100 employing an active bridge chiplet for coupling GPU chiplets in accordance with some embodiments. In the depicted example, the system 100 includes a central processing unit (CPU) 102 for executing instructions and an array 104 of one or more GPU chiplets, such as the three illustrated GPU chiplets 106-1, 106-2, and through 106-N (collectively, GPU chiplets 106). In various embodiments, and as used herein, the term "chiplet" refers to any device including, but is not limited to, the following characteristics: 1) a chiplet includes an active silicon die containing at least a portion of the computational logic used to solve a full problem (i.e., the computational workload is distributed across multiples of these active silicon dies); 2) chiplets are packaged together as a monolithic unit on the same substrate; and 3) the programming model preserves the concept that the combination of these separate computational dies (i.e., the GPU chiplets) are a single monolithic unit (i.e., each chiplet is not exposed as a separate device to an application that uses the chiplets for processing computational workloads).

In various embodiments, the CPU 102 is connected via a bus 108 to a system memory 110, such as a dynamic random access memory (DRAM). In various embodiments, the system memory 110 is implemented using other types of memory including static random access memory (SRAM), nonvolatile RAM, and the like. In the illustrated embodiment, the CPU 102 communicates with the system memory 110 and also the GPU chiplet 106-1 over bus 108 that is implemented as a peripheral component interconnect (PCI) bus, PCI-E bus, or other type of bus. However, some embodiments of the system 100 includes the GPU chiplet 106-1 communicating with the CPU 102 over a direct connection or via other buses, bridges, switches, routers, and the like.

As illustrated, the CPU 102 includes a number of processes, such as executing one or more application(s) 112 to generate graphic commands and a user mode driver 116 (or other drivers, such as a kernel mode driver). In various embodiments, the one or more applications 112 include applications that utilize the functionality of the GPU chiplets 106, such as applications that generate work in the system 100 or an operating system (OS). In some embodiments, an application 112 includes one or more graphics instructions that instruct the GPU chiplets 106 to render a graphical user interface (GUI) and/or a graphics scene. For example, in some embodiments, the graphics instructions include instructions that define a set of one or more graphics primitives to be rendered by the GPU chiplets 106.

In some embodiments, the application 112 utilizes a graphics application programming interface (API) 114 to invoke a user mode driver 116 (or a similar GPU driver). User mode driver 116 issues one or more commands to the array 104 of one or more GPU chiplets for rendering one or more graphics primitives into displayable graphics images. Based on the graphics instructions issued by application 112 to the user mode driver 116, the user mode driver 116 formulates one or more graphics commands that specify one or more operations for GPU chiplets to perform for rendering graphics. In some embodiments, the user mode driver 116 is a part of the application 112 running on the CPU 102. For example, in some embodiments the user mode driver 116 is part of a gaming application running on the CPU 102. Similarly, in some embodiments a kernel mode driver (not shown) is part of an operating system running on the CPU 102.

In the depicted embodiment of FIG. 1, an active bridge chiplet 118 communicably couples the GPU chiplets 106 (i.e., GPU chiplets 106-1 through 106-N) to each other. Although three GPU chiplets 106 are shown in FIG. 1, the number of GPU chiplets in the chiplet array 104 is a matter of design choice and varies in other embodiments, such as described in more detail below. In various embodiments, such as discussed below in more detail with respect to FIG. 2, the active bridge chiplet 118 includes an active silicon bridge that serves as a high-bandwidth die-to-die interconnect between GPU chiplet dies. Additionally, the active bridge chiplet 118 operates as a memory crossbar with a shared, unified last level cache (LLC) to provide inter-chiplet communications and to route cross chiplet synchronization signals. Caches are naturally an active component (i.e., require electrical power for operations), so the memory crossbar (e.g., the active bridge chiplet 118) is active for holding those cache memories. Cache sizing is therefore configurable, as a function of the physical size of the active bridge chiplet 118, for different applications along with different chiplet configurations, and the base chiplet(s) to which the active bridge chiplet 118 (e.g., the GPU chiplets 106) is communicably coupled do not pay the cost (e.g., costs related to physical space, power constraints, and the like) of this external cache on the active bridge chiplet 118.

As a general operational overview, the CPU 102 is communicably coupled to a single GPU chiplet (i.e., GPU chiplet 106-1) through the bus 108. CPU-to-GPU transactions or communications from the CPU 102 to the array 104 of chiplets 106 is received at the GPU chiplet 106-1. Subsequently, any inter-chiplet communications are routed through the active bridge chiplet 118 as appropriate to access memory channels on other GPU chiplets 106. In this manner, the GPU chiplet-based system 100 includes GPU chiplets 106 that are addressable as a single, monolithic GPU from a software developer's perspective (e.g., the CPU 102 and any associated applications/drivers are unaware of the chiplet-based architecture), and therefore avoids requiring any chiplet-specific considerations on the part of a programmer or developer.

Figure 2:
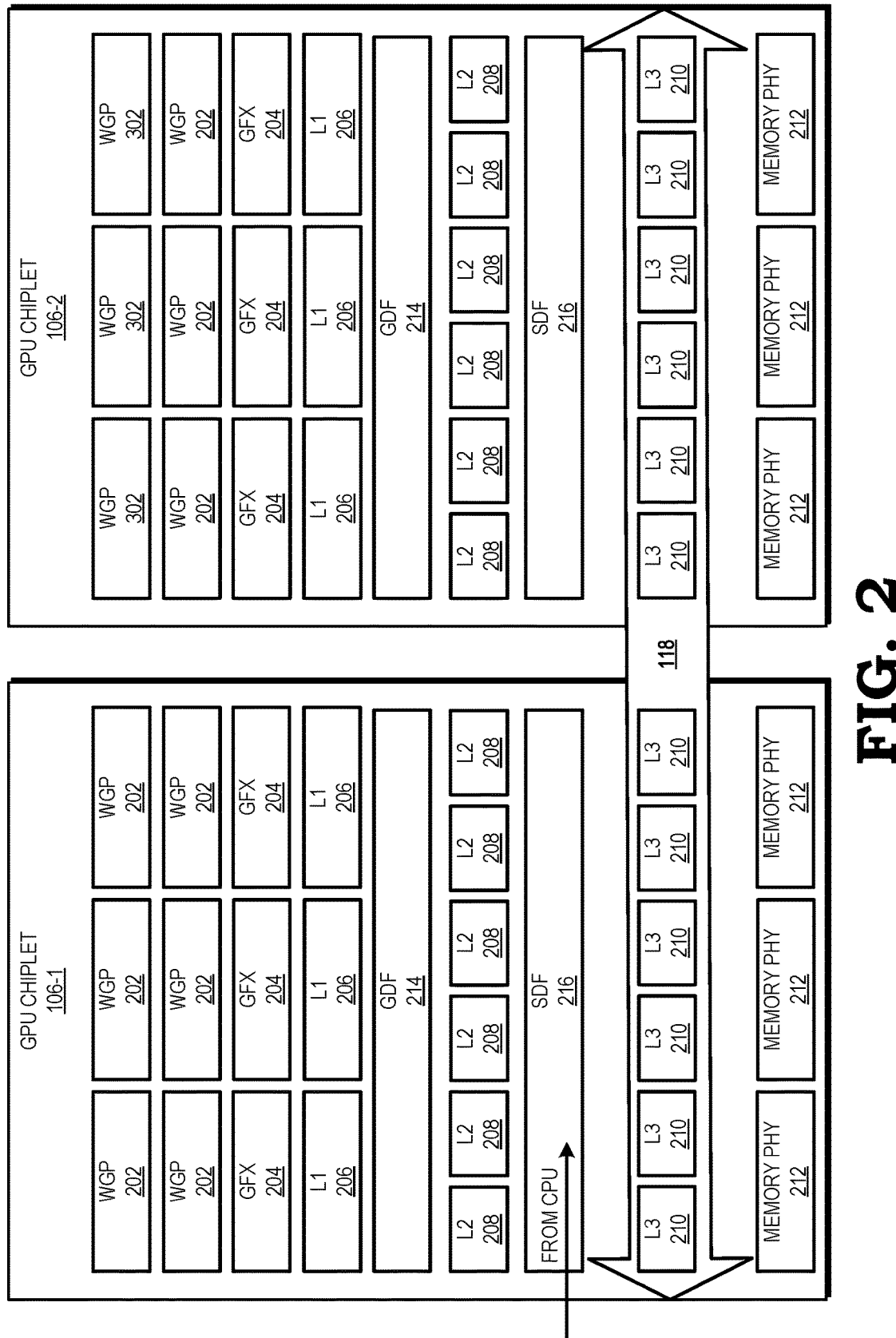
FIG. 2 is a block diagram illustrating a cache hierarchy of GPU chiplets coupled by an active bridge chiplet in accordance with some embodiments.

FIG. 2 is a block diagram illustrating a cache hierarchy of GPU chiplets coupled by an active bridge chiplet in accordance with some embodiments. The view 200 provides a hierarchical view of GPU chiplets 106-1, 106-2, and the active bridge chiplet 118 of FIG. 1. Each of the GPU chiplets 106-1, 106-2 include a plurality of workgroup processors 202 (WGP) and a plurality of fixed function blocks 204 (GFX) that communicate with a given channel's L1 cache memory 206. Each GPU chiplet 106 also includes a plurality of L2 cache memory 208 banks that are individually accessible and a plurality of memory PHY 212 (denoted as graphics double data rate (GDDR) in FIG. 2 for indicating connection to GDDR memory) channels mapped to the L3 channels. The L2 level of cache is coherent within a single chiplet and the L3 level (L3 cache memory 210 or other last level) of cache is unified and coherent across all of the GPU chiplets 106. In other words, the active bridge chiplet 118 includes a unified cache (e.g., the L3/LLC of FIG. 2) that is on a separate die than the GPU chiplets 106 and provides an external unified memory interface that communicably links two or more GPU chiplets 106 together. The GPU chiplets 106 therefore acts as a monolithic silicon die starting from the register transfer level (RTL) perspective and provides fully coherent memory access.

In various embodiments, the L3 level 210 of cache is a memory-attached last level. In conventional cache hierarchies, routing occurs between L1 and L2 levels of cache, and also between L2 levels and memory channels. This routing allows the L2 cache to be coherent within a single GPU core. However, the routing introduces a synchronization point when a different GPU core that has access to the GDDR memory (such as by the display engine, multi-media core, or the CPU) wants to access the data that is to be manipulated by the GPU core, as the L2 level of cache must be flushed to GDDR memory so that the other GPU cores are able to access the most recent data. Such operations are computationally costly and inefficient. In contrast, the memory-attached last level L3 210 that sits between the memory controller and the GPU chiplets 106 avoids these issues by providing a consistent "view" of the cache and memory to all attached cores.

The memory-attached last level L3 210 puts the L3 level of cache hierarchy at the active bridge chiplet 118 instead of at the GPU chiplets 106. Accordingly, if another client accesses data (e.g., CPU accessing data in DRAM), the CPU 102 comes through and connects to SDF fabric 216 to read from the L3 level 210. Furthermore, the L3 level 210 reads from GDDR memory (not shown, but via memory PHYs 212) if the requested data is not cached in the L3 level 210.

Accordingly, the L2 levels 208 will contain data and not be flushed. In other embodiments, instead of the L3 level 210 being a memory-attached last level, the L3 level of cache is positioned above the SDF fabric 216 in the cache hierarchy. However, in such a configuration, the L3 level (and also the memory PHYS 212) would be local to each GPU chiplet 106 and would therefore no longer be part of a unified cache at the active bridge chiplet 118.

A graphics data fabric 214 (GDF) of each GPU chiplet 106 connects all of the L1 cache memories 206 to each of the channels of the L2 cache memory 208, thereby allowing each of the workgroup processors 202 and fixed function blocks 204 to access data stored in any bank of the L2 cache memory 208. Each GPU chiplet 106 also includes a scalable data fabric 216 (SDF) (also known as a SOC memory fabric) that routes across the graphics core (GC) and system on chip (SOC) IP cores to the active bridge chiplet 118. The GC includes CUs/WGPs, fixed function graphics blocks, caches above L3, and the like. Portions of the GPU used for traditional graphics and compute (i.e., the GC) are differentiable from other portions of the GPU used for handling auxiliary GPU functionality such as video decode, display output, and various system supporting structures that are contained on the same die.

The active bridge chiplet 118 includes a plurality of L3 cache memory 210 channels that routes to all of the GPU chiplets (e.g., GPU chiplets 106-1 and 106-2 in FIG. 2). In this manner, a memory address request is routed to the appropriate lanes on the active bridge chiplet 118 to access the unified L3 cache memory 210. Further, as the physical dimensions of the active bridge chiplet 118 are large such as to span across multiple GPU chiplets 106, those skilled in the art will recognize that a scalable amount (which in different embodiments is scaled to increase or decrease amount of memory and logic) of L3/LLC cache memory and logic are, in some embodiments, positioned on the active bridge chiplet 118. The active bridge chiplet 118 bridges multiple GPU chiplets 106 and therefore is interchangeably referred to as a bridge chiplet, active bridge die, or active silicon bridge.

Figure 3:
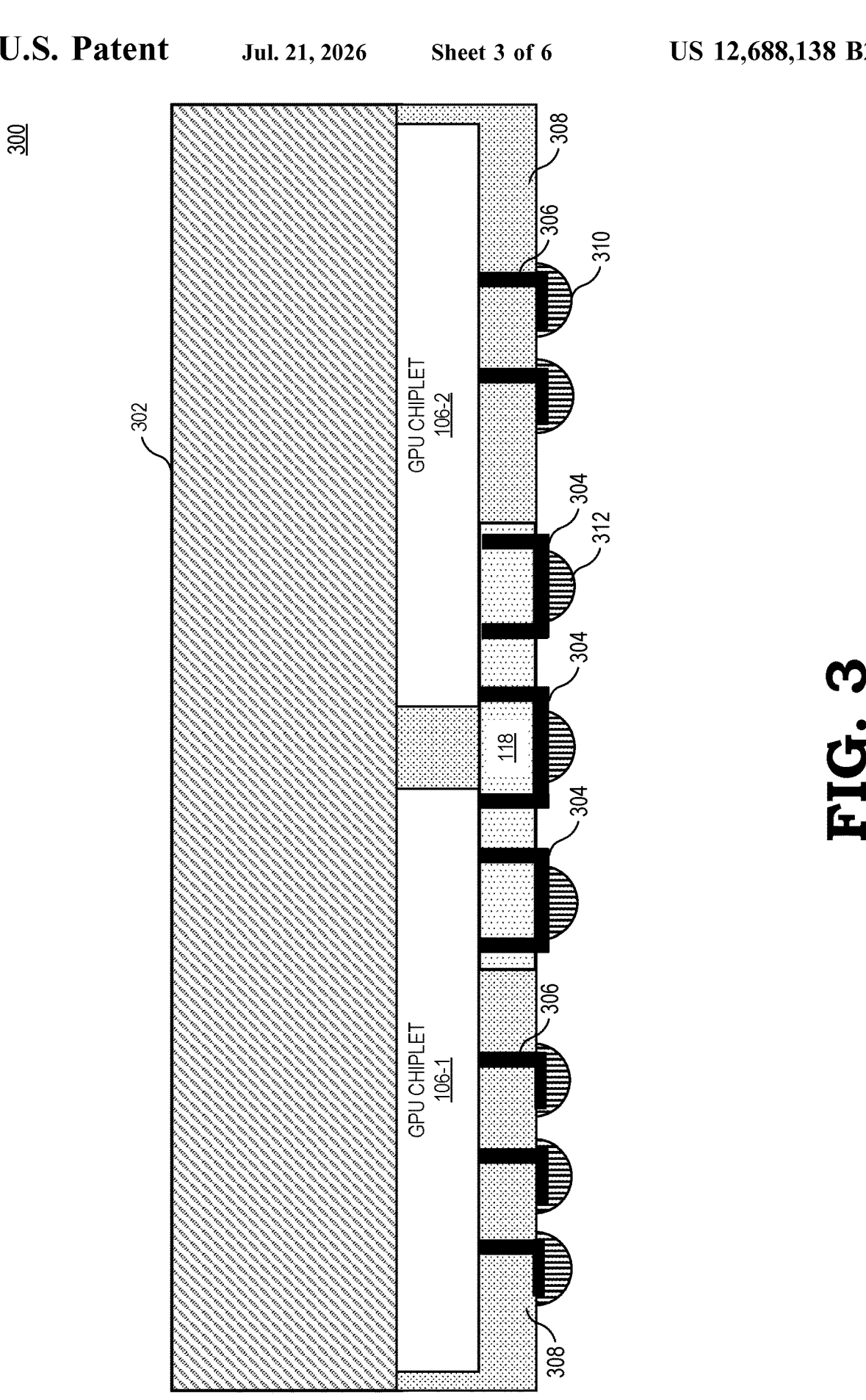
FIG. 3 is a block diagram illustrating a sectional view of GPU chiplets and active bridge chiplets in accordance with some embodiments.

Additional details of the chiplet-based architecture may be understood with reference to FIG. 3, which is a block diagram illustrating a sectional view of active-bridge-coupled GPU chiplets in accordance with some embodiments. The view 300 provides a sectional view of GPU chiplets 106-1, 106-2, and active bridge chiplet 118 of FIG. 1 taken at section A-A. In various embodiments, each GPU chiplet 106 is constructed without any through silicon vias (TSVs). As previously noted, the GPU chiplets 106 are communicably coupled by way of the active bridge chiplet 118. In various embodiments, the active bridge chiplet 118 is an interconnect chip constructed of silicon, germanium or other semiconductor materials and in different embodiments bulk semiconductor, semiconductor on insulator or other designs.

The active bridge chiplet 118 includes a plurality of internal conductor traces (not shown), which in different embodiments are on a single level or multiple levels. The traces interface electrically with, for example, conductor structures of the PHY regions of the GPU chiplets 106 (e.g., memory PHY 212 of FIG. 2) by way of conducting pathways. In this manner, the active bridge chiplet 118 is an active bridge die that communicably couples and routes communications between the GPU chiplets 106, thereby forming an active routing network.

As shown in FIG. 3, a carrier wafer 302 is bound to the GPU chiplets 106-1 and 106-2. In this embodiment configuration, TSVs 304 pass through the active bridge chiplet to the GPU chiplets 106 but the graphics core die(s) themselves are not constructed with any TSVs. Instead, in order to pass signal data through, through dielectric vias (TDVs) 306 tunnel through a gap fill dielectric layer 308. The gap fill dielectric layer 308 (or other gap fill material) occupies areas where the bridge chiplet die and graphics core die(s) are not present (e.g., areas with vertical discrepancy between the GPU chiplets 106 and the active bridge chiplet 118). As shown, the TDVs 306 connect input/output (I/O) power of the GPU chiplets 106 down to the solder interconnects 310, which in different embodiments include a solder bump, micro bump, and the like. In this manner, the gap fill dielectric layer 308 bring both planes of the bumps on both the GPU chiplets 106 and the active bridge chiplet 118 (e.g., bump 312) into the same plane.

In various embodiments, the components as illustrated in FIG. 3 interface electrically with other electrical structure, such as circuit boards or other structures, by way of interconnect structures 310 and 312 (e.g., solder balls and the like). However, those skilled in the art will appreciate that in other embodiments various types of interconnect structures such as pins, land grid array structures, other interconnects, and the like are used without departing from the scope of this disclosure.

Figure 4:
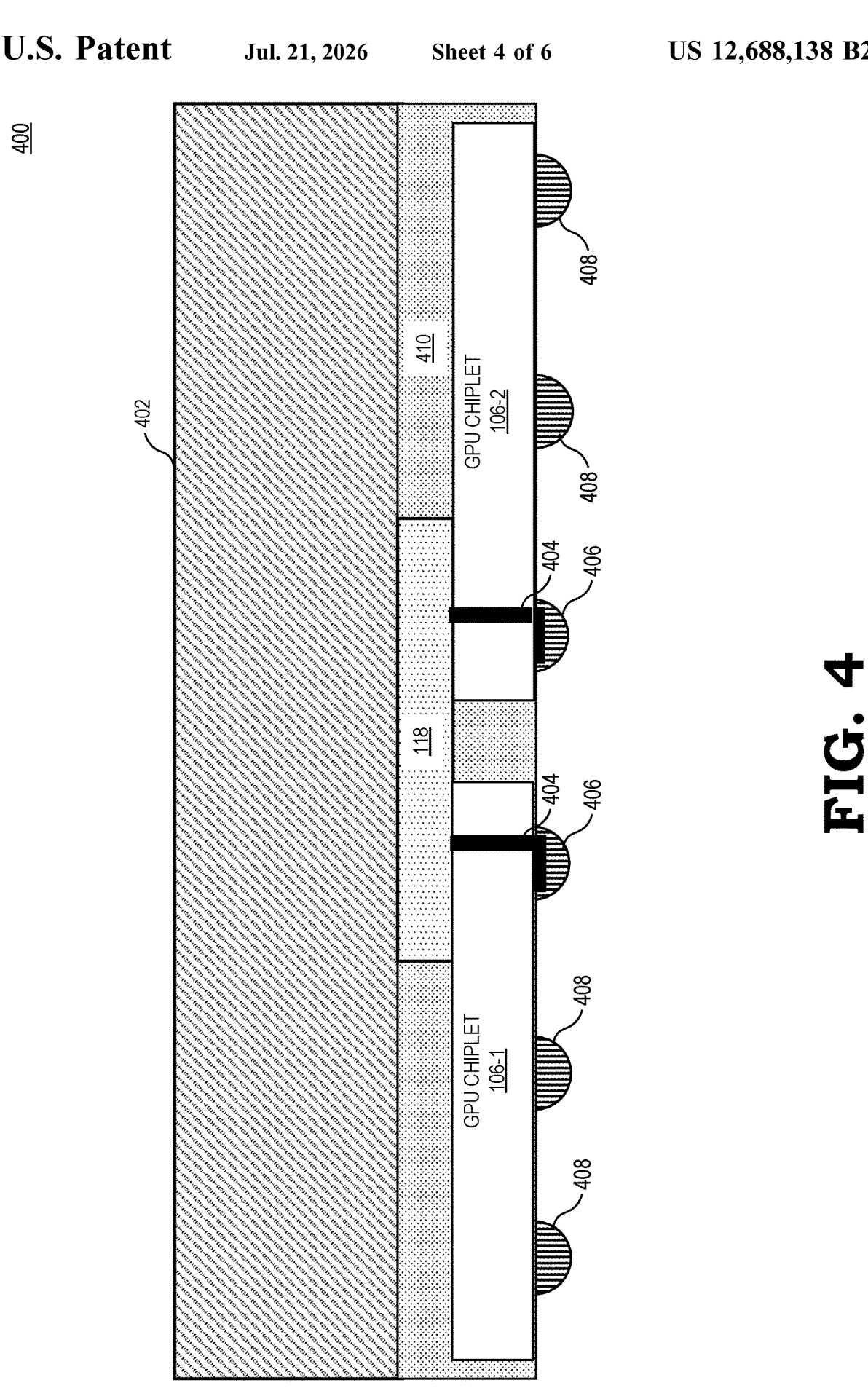
FIG. 4 is a block diagram illustrating another sectional view of GPU chiplets and an active bridge chiplet in accordance with some embodiments.

FIG. 4 is a block diagram of illustrating another sectional view of GPU chiplets and an active bridge chiplet in accordance with some embodiments. The view 400 provides a sectional view of GPU chiplets 106-1, 106-2, and active bridge chiplet 118 of FIG. 1 taken at section A-A. As previously noted, the GPU chiplets 106 are communicably coupled by way of the active bridge chiplet 118. In various embodiments, the active bridge chiplet 118 is an interconnect chip constructed, in different embodiments, of silicon, germanium or other semiconductor materials and in different embodiments is bulk semiconductor, semiconductor on insulator or other designs.

The active bridge chiplet 118 includes a plurality of internal conductor traces (not shown), which in different embodiments are on a single level or multiple levels. The traces interface electrically with, for example, conductor structures of the PHY regions of the GPU chiplets 106 (e.g., memory PHY 212 of FIG. 2) by way of conducting pathways. In this manner, the active bridge chiplet 118 is an active bridge die that communicably couples and routes communications between the GPU chiplets 106, thereby forming an active routing network.

As shown in FIG. 4, and in a manner similar to the components of FIG. 3, a carrier wafer 402 is bound to the GPU chiplets 106-1 and 106-2. However, in contrast to the embodiment of FIG. 3, each GPU chiplet 106 includes through silicon vias (TSVs) 404. In this embodiment configuration, TSVs 404 pass through the GPU chiplets 106 but the active bridge chiplet 118 itself is not constructed with any TSVs. Additionally, the active-bridge-coupled GPU chiplets also do not include any TDVs as the TSVs 404 connect input/output (I/O) power of the active bridge chiplet down to the solder interconnects 406, which in different embodiments include a solder bump, micro bump, and the like. Interconnect structures 408 electrically couple to the GPU chiplets 106. In various embodiments, a layer of dummy silicon 410 (or other gap fill material) occupies areas where the bridge chiplet die and graphics core die(s) are not present (e.g., areas with vertical discrepancy between the GPU chiplets 106 and the active bridge chiplet 118). In this manner, the layer of dummy silicon 410 bring both interconnect bumps associated with communicably and electrically coupling the GPU chiplets 106 and the active bridge chiplet 118 into the same plane and to form a monolithic chip.

In various embodiments, the components as illustrated in FIG. 4 interface electrically with other electrical structure, such as circuit boards, substrates, or other structures, by way of interconnect structures 406 and 408 (e.g., solder balls and the like). However, those skilled in the art will appreciate that in other embodiments various types of interconnect structures such as pins, land grid array structures, other interconnects, and the like are used.

The active bridge chiplet 118, such as described above with respect to FIGS. 1-4, thus provides communications between routing fabric of two or more dies and provides coherent L3 memory access with uniform memory access behavior (or mostly uniform memory access behavior). Those skilled in the art will recognize that the performance of a processing system generally scales linearly based on the number of GPU chiplets utilized by nature of physical duplication (e.g., as the number of GPU chiplets increases, so does the number of memory PHYs 212, WGPs 202, and the like).

Figure 5:
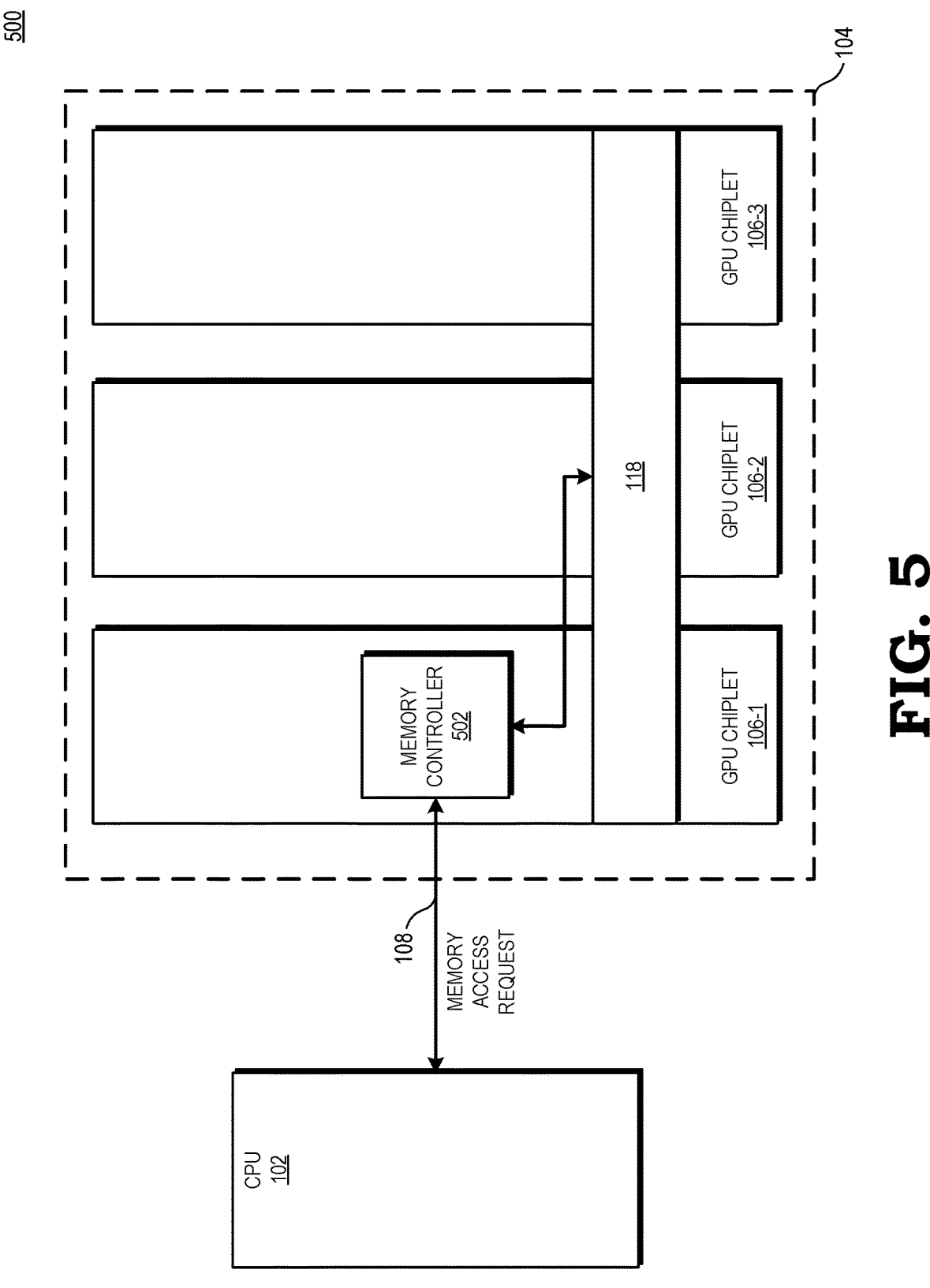
FIG. 5 is a block diagram illustrating a processing system utilizing a three-chiplet configuration in accordance with some embodiments.

Referring now to FIG. 5, illustrated is a block diagram of a processing system utilizing a three-chiplet configuration in accordance with some embodiments. The processing system 500 is similar to the processing system 100 of FIG. 1 but omits certain elements for ease of illustration. As illustrated, the system 500 includes the CPU 102 and three GPU chiplets, such as the illustrated GPU chiplets 106-1, 106-2, and 106-3. The CPU 102 communicates with GPU chiplet 106-1 via the bus 108. As a general operational overview, the processing system 500 utilizes a master-slave topology in which a single GPU chiplet in direct communication with the CPU 102 (i.e., GPU chiplet 106-1) is designated as the master chiplet (hereinafter, primary GPU chiplet or host GPU chiplet). The other GPU chiplets communicate with the CPU 102 indirectly via the active bridge chiplet 118 and are designated as the slave chiplets (hereinafter, secondary GPU chiplet(s)). Accordingly, the primary GPU chiplet 106-1 serves as the singular entry point from the CPU 102 to the entire GPU chiplet array 104.

As illustrated in FIG. 5, in one example, the CPU 102 transmits an access request (e.g., read request, write request, instruction to perform work at the GPU chiplets, and the like) to the primary GPU chiplet 106-1. As previously described in more detail with respect to FIG. 2, the GPU chiplet 106-1 includes a plurality of workgroup processors (not shown) and a plurality of fixed function blocks (not shown). The primary GPU chiplet controller 502 connects to the last level cache (LLC) of the GPU chiplet array 104 (e.g., L3 cache memory as discussed herein), and handles routing between the LLC and electrically-active portions of the logic of data fabric crossbars (e.g., SDF 216 of FIG. 2).

The primary GPU chiplet controller 502 determines whether data associated with the access request is locally cached at memory coherent only within the single primary GPU chiplet 106-1 or whether the data is cached in unified L3 cache memory 210 at the active bridge chiplet 118. Based on determining that the data associated with the access request is locally cached at memory coherent within the single primary GPU chiplet 106-1, the primary GPU chiplet controller 502 services the access request at the primary GPU chiplet 106-1. However, based on determining that the data associated with the access request is cached at the commonly shared L3 cache memory 210, the primary GPU chiplet controller 502 routes the access request to the active bridge chiplet 118 for servicing. The active bridge chiplet

118 returns the result back to primary GPU chiplet 106-1, which subsequently returns the requested data to the originating requestor (i.e., CPU 102). In this manner, the CPU 102 only has a single external view and does not require direct communications to two or more GPU chiplets 106 via bus 108.

Those skilled in the art will recognize that although FIG. 5 is described here in the specific context of a rectangular active bridge chiplet die 118 spanning across the middle of three GPU chiplets, in other embodiments various other configurations, die shapes, and geometries are utilized in various embodiments. For example, in some embodiments, the chiplets include active bridge chiplets at one or more corners of a square GPU chiplet such that multiple GPU chiplets are tiled together in a chiplet array. Similarly, in other embodiments, GPU chiplets include active bridge chiplets spanning an entire side of a GPU chiplet such that multiple GPU chiplets are strung together in a long row/column configuration with an intervening active bridge chiplet.

Figure 6:
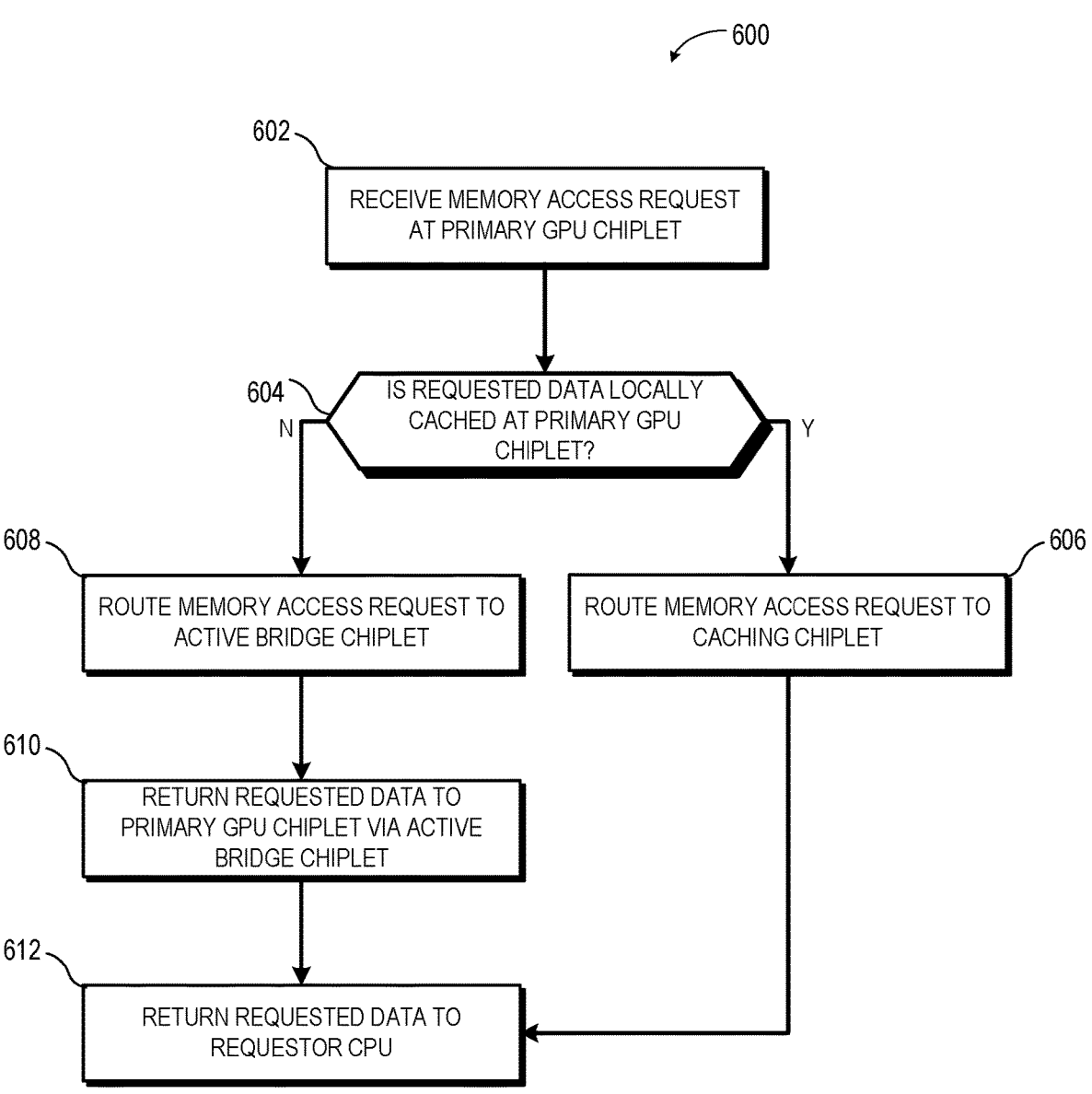
FIG. 6 is a flow diagram illustrating a method of performing inter-chiplet communications in accordance with some embodiments.

FIG. 6 is a flow diagram illustrating a method 600 of performing inter-chiplet communications in accordance with some embodiments. At block 602, a primary GPU chiplet of a GPU chiplet array receives a memory access request from a requesting CPU. For example, with reference to FIG. 5, the primary GPU chiplet 106-1 receives an access request from the CPU 102. In some embodiments, the primary GPU chiplet 106-1 receives the access request at its scalable data fabric 216 via the bus 108.

At block 604, the primary GPU chiplet 106-1 identifies a location at which the requested data is cached. That is, the primary GPU chiplet 106-1 determines whether the data is cached in unified L3 cache memory 210 at the active bridge chiplet 118. For example, with reference to FIG. 5, a primary GPU chiplet controller 502 of the primary GPU chiplet 106-1 determines whether data associated with the access request is locally cached at memory coherent only within the single primary GPU chiplet 106-1. If the primary GPU chiplet controller 502 determines that the data associated with the access request is locally cached at memory coherent within the single primary GPU chiplet 106-1, the primary GPU chiplet controller 502 services the access request at the primary GPU chiplet 106-1 at block 606. Subsequently, at block 612, the primary GPU chiplet returns the requested data to the originating requestor (i.e., CPU 102) via the bus 108. In some embodiments, returning the requested data to the CPU 102 includes receiving the requested data at the scalable data fabric 216 of the primary GPU chiplet (i.e., GPU chiplet 106-1) and transmitting the requested data to the CPU 102 via bus 108.

Returning back to block 604, if the primary GPU chiplet controller 502 determines that the data associated with the access request is cached at the commonly shared L3 cache memory 210, the primary GPU chiplet controller 502 routes the access request to the active bridge chiplet 118 for servicing at block 608. In some embodiments, routing the memory access request includes the scalable data fabric 216 communicating with the active bridge chiplet 118, the scalable data fabric 216 requesting a data associated with the memory access request from the active bridge chiplet 118. Additionally, if the requesting data is not cached in the L3 of the active bridge chiplet 118, the memory access request is treated as an L3 miss and the active bridge chiplet 118 routes the request to the GPU chiplet that is attached to the GDDR memory and that is responsible for servicing the request. The GPU chiplet that the request was routed to then fetches the requested data from GDDR memory and returns it to the active bridge chiplet.

At block 610, the active bridge chiplet 118 returns the result back to the primary GPU chiplet 106-1. In particular, the return communication is routed via the same signal route of the active bridge chiplet 118 from which the memory access request was routed in block 608. In other embodiments, the request data port and the return data port do not share the same physical route.

At block 612, the primary GPU chiplet returns the requested data to the originating requestor (i.e., CPU 102) via the bus 108. In some embodiments, returning the requested data to the CPU 102 includes receiving the requested data from the active bridge chiplet 118 at the scalable data fabric 216 of the primary GPU chiplet (i.e., GPU chiplet 106-1) and transmitting the requested data to the CPU 102 via bus 108. In this manner, the CPU 102 only has a single external view and does not require direct communications to two or more GPU chiplets 106 via bus 108.

Accordingly, as discussed herein, an active bridge chiplet deploys monolithic GPU functionality using a set of interconnected GPU chiplets in a manner that makes the GPU chiplet implementation appear as a traditional monolithic GPU from a programmer model/developer perspective. The scalable data fabric of one GPU chiplet is able to access the lower level cache(s) on the active bridge chiplet in nearly the same time as to access the lower level cache on its same chiplet, and thus allows the GPU chiplets to maintain cache coherency without requiring additional inter-chiplet coherency protocols. This low-latency, inter-chiplet cache coherency in turn enables the chiplet-based system to operate as a monolithic GPU from the software developer's perspective, and thus avoids chiplet-specific considerations on the part of a programmer or developer.

A computer readable storage medium may include any non-transitory storage medium, or combination of non-transitory storage media, accessible by a computer system during use to provide instructions and/or data to the computer system. Such storage media include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium includes, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processor comprising:
   a chiplet array including a first chiplet, a second chiplet, and an active bridge chiplet shared by the first chiplet and the second chiplet, the active bridge chiplet configured to actively route inter-chiplet memory access requests and comprising memory shared by the first chiplet and the second chiplet,
   wherein the first chiplet is configured to:
      route one or more memory access requests serviceable by the active bridge chiplet or the second chiplet to the active bridge chiplet or the second chiplet for servicing.

2. The processor of claim 1, wherein the first chiplet is configured to receive a memory access request from a processor.

3. The processor of claim 2, wherein the first chiplet is further configured to
   return data associated with the memory access request to the processor.

4. The processor of claim 2, wherein the first chiplet further comprises a scalable data fabric configured to receive the memory access request from the processor.

5. The processor of claim 1, wherein the first chiplet is configured to route a memory access request by routing the memory access request to the second chiplet via the active bridge chiplet.

11 12

6. The processor of claim 5, wherein the first chiplet is configured to route the memory access request to the second chiplet in response to data associated with the memory access request being stored in a memory associated with the second chiplet.

7. The processor of claim 1, wherein the first chiplet is configured to route a memory access request by routing the memory access request to the memory at the active bridge chiplet.

8. The processor of claim 7, wherein the memory comprises a unified cache memory that is coherent across the first chiplet and the second chiplet.

9. The processor of claim 1, wherein the first chiplet is configured to request data, associated with a memory access request, from the active bridge chiplet.

10. The processor of claim 1, wherein the active bridge chiplet communicably couples chiplets in the chiplet array.

11. A system comprising:
a processor communicably coupled to a first chiplet of a chiplet array, wherein the chiplet array includes:
an active bridge chiplet configured to actively route inter-chiplet memory access requests and having memory shared by the first chiplet and a second chiplet;
the first chiplet communicably coupled to the processor via a bus; and
a second chiplet communicably coupled to the first chiplet via the active bridge chiplet,
wherein the first chiplet is configured to route one or more memory access requests serviceable by the active bridge chiplet or the second chiplet to the active bridge chiplet or the second chiplet for servicing.

12. The system of claim 11, wherein the first chiplet is further configured to:
responsive to data associated with a memory access request received from the processor being locally cached at memory coherent only within the first chiplet, service the memory access request.

13. The system of claim 11, wherein the first chiplet is further configured to:
responsive to data associated with a memory access request received from the processor being cached at a level of cache memory that is shared by the first chiplet and the second chiplet, route the memory access request to the active bridge chiplet for servicing.

14. The system of claim 11, wherein the first chiplet is further configured to:
responsive to data associated with a memory access request received from the processor being stored in a memory associated with the second chiplet, route the memory access request to the second chiplet via the active bridge chiplet for servicing.

15. A method comprising:
receiving, at a first chiplet of a chiplet array, a memory access request from a processor;
responsive to the memory access request being serviceable by a second chiplet of the chiplet array, routing, by an active bridge chiplet controller of the first chiplet, the memory access request to the second chiplet for servicing;
responsive to the memory access request being serviceable by an active bridge chiplet having memory shared by the first chiplet and the second chiplet, routing, by the active bridge chiplet controller of the first chiplet, the memory access request to the memory at the active bridge chiplet that is shared by the first chiplet and the second chiplet for servicing; and
returning data associated with the memory access request to the processor.

16. The method of claim 15, wherein routing the memory access request to the second chiplet is in response to data associated with the memory access request being stored in a memory associated with the second chiplet.

17. The method of claim 15, wherein routing the memory access request comprises:
routing the memory access request to the second chiplet via the active bridge chiplet.

18. The method of claim 15, wherein the memory is a unified last level cache at the active bridge chiplet.

* * * * *